United States Patent [19]

Kindlmann

[11] Patent Number: 4,527,096
[45] Date of Patent: Jul. 2, 1985

[54] DRIVE CIRCUIT FOR CAPACITIVE ELECTROLUMINESCENT PANELS

[75] Inventor: Peter J. Kindlmann, Guilford, Conn.

[73] Assignee: Timex Corporation, Waterbury, Conn.

[21] Appl. No.: 578,236

[22] Filed: Feb. 8, 1984

[51] Int. Cl.³ .................................... H05B 37/00
[52] U.S. Cl. ........................ 315/169.3; 315/205; 315/226; 362/29; 368/67
[58] Field of Search ............ 315/169.3, 205, 226; 362/23, 29; 368/67

[56] References Cited

U.S. PATENT DOCUMENTS

| | | | |
|---|---|---|---|
| 4,170,747 | 10/1979 | Holmes | 315/307 |
| 4,210,848 | 7/1980 | Suzuki et al. | 315/169.3 |
| 4,277,728 | 7/1981 | Stevens | 315/DIG. 7 |
| 4,412,155 | 10/1983 | Isaka et al. | 315/169.3 |
| 4,443,741 | 4/1984 | Tanaka et al. | 315/169.3 |

*Primary Examiner*—Harold Dixon
*Attorney, Agent, or Firm*—William C. Crutcher

[57] ABSTRACT

A drive circuit is disclosed which includes a converter that provides current pulses that charge a capacitive electroluminescent lamp to produce light and a switching circuit that switches a predetermined number of successive current pulses at high frequency for progressively charging the electroluminescent lamp. The switching circuit also reverses the polarity of the electroluminescent lamp at low frequency when the electroluminescent lamp discharges at the end of a predetermined number of successive current pulses and before the electroluminescent lamp charges again by current pulses produced by the converter. The switching circuit is connected to and is responsive to signals provided by the timepiece frequency divider circuit and the converter is connected to the timepiece battery for stepping up the battery voltage to provide for the charging current pulses. The EL lamp is used as its own storage capacitor and receives substantially all of the energy provided by the converter.

19 Claims, 3 Drawing Figures

DRIVE CIRCUIT FOR CAPACITIVE ELECTROLUMINESCENT PANELS

BACKGROUND OF THE INVENTION

This invention relates to the driving of electroluminescent (EL) lamps to be used as backlights for timepiece displays. More specifically, the invention relates to a driving circuit that uses a converter to progressively charge a capacitive EL lamp with a predetermined number of successive current pulses.

EL panels (lamps) having different characteristics and electronic circuits used to drive the lamps are shown extensively in the prior art. Generally, EL lamps are characterized as lossy capacitors that require ac excitation signals having amplitudes such as 40 to 80 volts, peak-to-peak, which are larger than can be provided by a timepiece battery. See U.K. Patent Specification No. 1,382,256 (Sliker), Technical Documentary Report No. RADC-TDR-64-159 prepared by RCA for the Air Force Systems Command and U.S. Pat. No. 4,238,793 issued to Hochstrate. Copending U.S. patent application Ser. Nos. 362,708, 514,078, 417,779, and 490,621, all having the same assignee herewith, disclose EL lamps and drive circuits.

As a specific example, U.S. Pat. No. 4,011,557 issued to Chetelat et al. discloses an EL watch display which is run from a small battery. The EL watch display is fed by short impulses of high-intensity current by means of discharges from two capacitors which are alternately charged and discharged by transistor switches opened and closed by externally supplied impulses. In this case, EL diodes (a type of LED) are used to form the display symbols. However, current is not continually fed to each LED which is to be lighted. Each LED is impulse-operated at a frequency exceeding 30 Hz. The impulses are provided by two capacitors which are alternately charged and discharged. In effect, the energy in the field of a capacitor is discharged across a capacitive EL lamp, i.e. an EL display diode. The capacitors serve as a high-voltage supply for charging each capacitive EL display diode depending upon the state of the transistor switches. However, every time an uncharged EL display diode is charged from a capacitor, energy is dissipated in the resistances of the switches and the capacitive EL display diode itself. Therefore, recharge efficiency is low due to this dissipation of energy.

It is an object of this invention to provide a high efficiency drive circuit that delivers directly to a capacitive EL lamp substantially all of the energy produced by the drive circuit.

Another object of the invention is to provide a drive circuit that converts power efficiently to EL lamps having different lamp characteristics.

Another object of the invention is to provide a drive circuit for driving an EL lamp used as a backlight in timepiece displays.

It is another object of the invention to provide a drive circuit that drives an EL lamp from a timepiece battery using a converter that steps up the low battery voltage.

An object of the invention is to provide a drive circuit that progressively charges an EL lamp, which acts as storage capacitor, with successive current pulses provided by the converter.

Yet another object of the invention is to alternate EL lamp polarity at the end of a predetermined number of successive lamp charging current pulses.

It is still another object of this invention to provide a drive circuit that includes a converter that has an inductor for stepping up the timepiece battery voltage to successively higher voltages that progressively charge the capacitive EL lamp at each of two alternate polarities.

Still another object of this invention is to provide high EL lamp light output from a single-cell timepiece battery at low current drain.

A further object of this invention is to use an inductor in the drive circuit for energy exchange with the capacitive EL lamp.

SUMMARY OF THE INVENTION

The present invention is a drive circuit that is electrically connected to a capacitive electroluminescent lamp which provides backlighting for a timepiece in which the timepiece includes a battery and a frequency divider circuit. The drive circuit has a converter that is electrically connected to the battery and to the capacitive electroluminescent lamp for stepping up the battery voltage to provide current pulses that charge the capacitive electroluminescent lamp to produce light, and a switching circuit that is electrically connected to the frequency divider circuit, to the capacitive electroluminescent lamp, and to the converter and which responds to intermediate frequency signals provided by the frequency divider circuit for switching a predetermined number of successive current pulses at high frequency that progressively charge the capacitive electroluminescent lamp and for switching the polarity of the capacitive electroluminescent lamp at low frequency when the electroluminescent lamp discharges at the end of a predetermined number of successive current pulses and before the capacitive electroluminescent lamp charges again by current pulses produced by the converter.

DESCRIPTION OF THE PREFERRED EMBODIMENT

Figure 1:
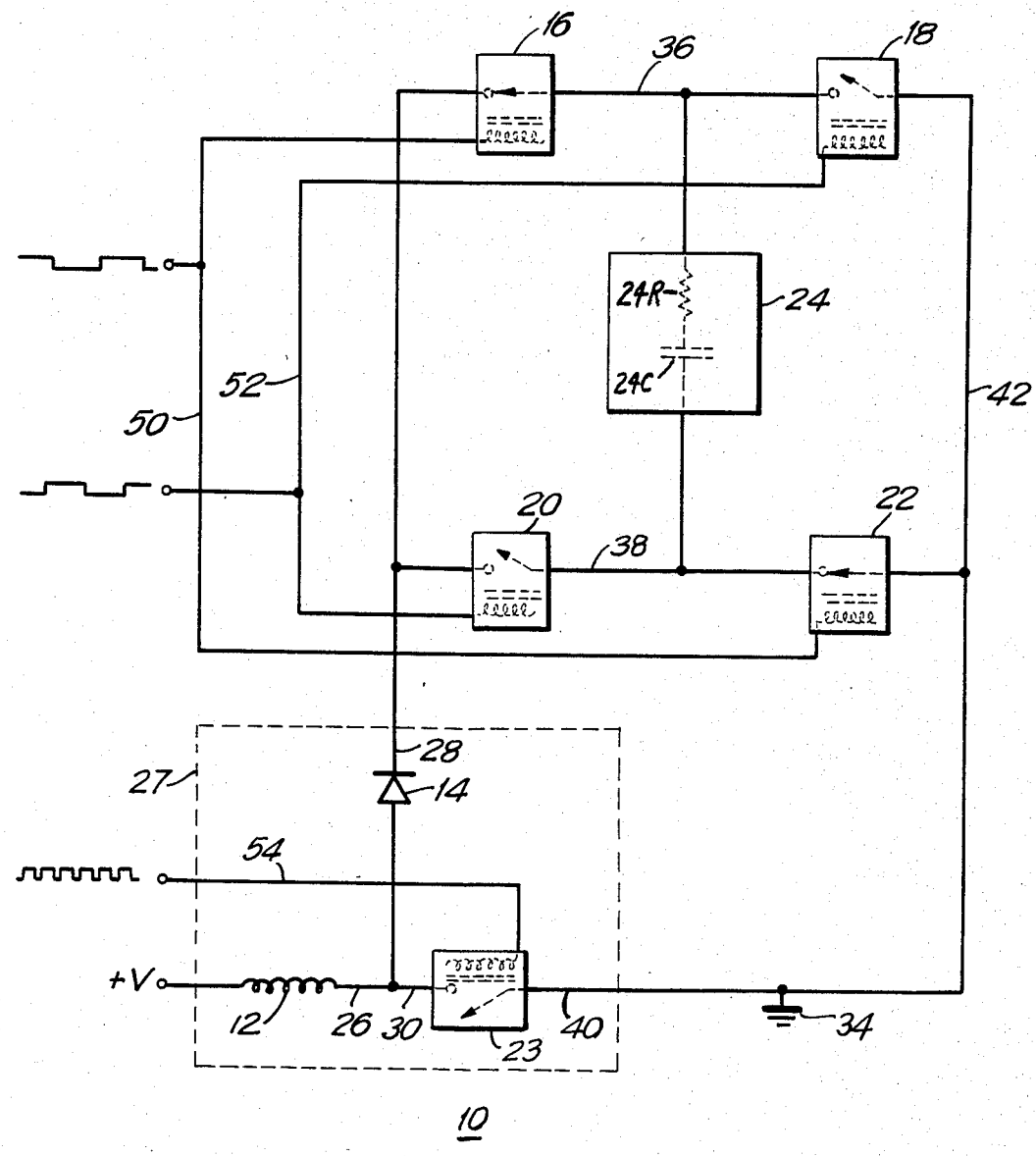
FIG. 1 is a circuit diagram of the drive circuit of the invention.

Electroluminescent (EL) lamp drive circuit 10, which is shown in FIG. 1, is to be used primarily to drive a capacitive EL lamp that provides backlighting for a timepiece display. The circuit is designed to energize an EL lamp from a single cell battery (+V) to produce light with a brightness of up to 0.4 foot-lamberts. The lamp has a thickness of approximately 2.5 mils and the battery is approximately 1.5 volts.

Current-mode bridge drive circuit 10 includes inductor 12, diode 14, and first, second, third, fourth, and fifth switches 16, 18, 20, 22, and 23, respectively. The drive circuit is electrically connected to EL lamp 24. EL lamp 24 is also shown, equivalently, as discrete capacitor 24C in series with discrete resistor 24R.

In the drive circuit, inductor 12, which is a two-terminal inductor, has one terminal electrically connected to diode 14 and to fifth switch 23 at a common point and the other terminal electrically connected to battery +V. The inductor-diode-fifth switch combination forms converter 27 that steps up the 1.5 volt battery voltage to between approximately 30 to 50 volts. This stepped up voltage progressively charges capacitive EL lamp 24 at each lamp polarity, which depends upon the state of first, second, third, and fourth switches, so as to produce a drive voltage amplitude between approximately 60 to 100 volts peak-to-peak. The converter has low power consumption but provides a high step-up ratio.

In drive circuit 10, inductor 12, in line 26, is connected to the anode of diode 14, which is in line 28, and one terminal of fifth switch 23, which is in line 30. The other terminal of switch 23 is electrically connected to ground 34 via line 40. Converter 27, which includes inductor 12, diode 14, and fifth switch 23, is electrically connected to EL lamp 24 via line 28 through EL lamp charging circuit (switching means) which comprises first, second, third, and fourth switches, 16, 18, 20, and 22 respectively.

First and second switches, 16 and 18, in line 36, and third and fourth switches, 20 and 22, in line 38, are electrically connected to line 28. Specifically, one terminal of first switch 16 and one terminal of third switch 20 are electrically connected, via line 28, to the cathode of diode 14. One terminal of second switch 18 and one terminal of fourth switch 22 are electrically connected to ground 34 via line 42. The other terminals of first and second switches, 16 and 18, are electrically connected together via line 36, and the other terminals of third and fourth switches, 20 and 22, are electrically connected together via line 38. Capacitive EL lamp is electrically connected to line 36 between the first and second switches, and to line 38 between the third and fourth switches.

Figure 2:
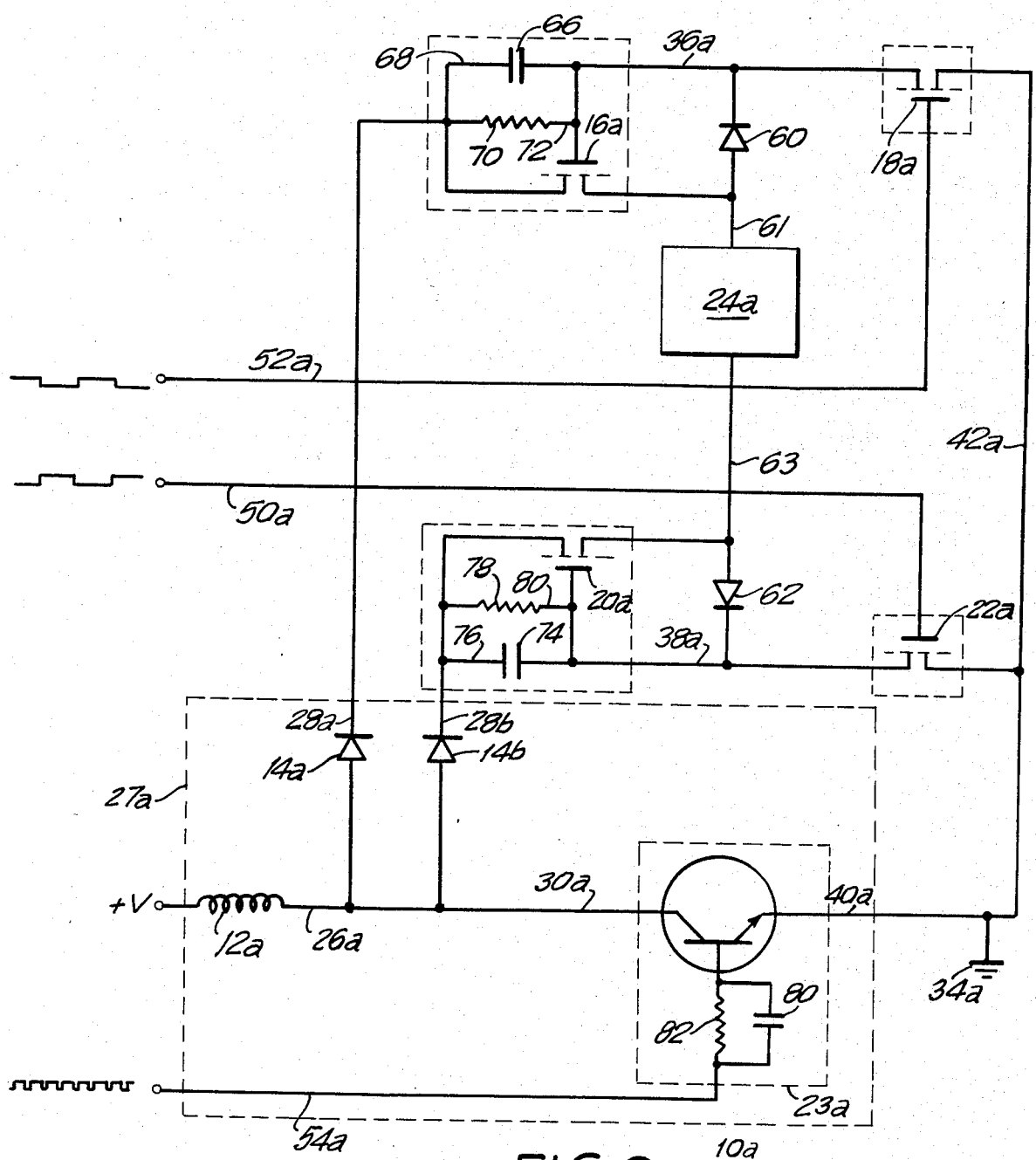
FIG. 2 is a circuit diagram of another embodiment of the drive circuit of FIG. 1.

In FIG. 1, the switches are all represented as electromechanical relays each having a multiturn coil wound on an iron core near an armature with a movable end-contact. As is known in the art, when control current flows through the coil, a magnetic field is produced which attracts the armature, closing the movable contact against a stationary contact. The movable contacts and coils are represented in FIG. 1 by dotted lines to suggest that substantially any type of signal-actuated switching device can be used. For example, an electronic relay can be used that includes an electronic component (field effect transistors, junction transistors, silicon controlled rectifiers, etc.) designed to switch on as a result of the application of appropriate gating signals. Of course, the fully electronic relay does not have any mechanical moving parts. FIG. 2 shows another embodiment of the drive circuit of the invention to include electronic relay components (transistors). The circuit of FIG. 2 will be described more completely below.

In FIG. 1, first switch 22 (its coil) is electrically connected to fourth switch 22 (its coil) via line 50 and second switch 18 (its coil) is electrically connected to third switch 20 (its coil) via line 52 such that gating signals applied to line 50 open and close the movable contacts of the first and fourth switches substantially simultaneously and gating signals applied to line 52 open and close the movable contacts of the second and third switches substantially simultaneously.

First and fourth switches (the movable contacts) will be in the same state (opened or closed) and second and third switches (the movable contacts) will be in the same state (opened or closed), but first and fourth switches will not be in the same state as second and third switches. The gating signals used to open (switch off) and close (switch on) the relay contacts of the first, second, third, and fourth switches are provided by the timepiece binary frequency divider circuit (not shown) which, as is understood, generally comprises serially connected flip-flops (stages) electrically connected to the timepiece crystal controlled oscillator. The divider circuit or signal generating means provides gating signals at predetermined frequencies on lines 50 and 52 to control the state of the switches implemented in the EL lamp charging circuit shown in FIG. 1. Fifth switch 23 (its coil) is also electrically connected to an intermediate stage of the divider circuit via line 54. The signal provided on line 54 controls the state (opened or closed) of the fifth switch in predetermined relationship with the gating signals that control the states of first, second, third, and fourth switches. The signal provided on line 54 is at a much higher frequency than the gating signals provided on lines 50 and 52.

In drive circuit 10 of FIG. 1, substantially all of the electrical energy stored in the field of inductor 12 is delivered directly to EL lamp 24, which acts as a storage capacitor. This direct connection indicates that the power conversion efficiency is high. The amount of stored electrical energy delivered directly to the EL lamp is dependant on the (ideal) characteristics of the switches. The circuit of FIG. 1 operates in substantially the following manner:

1. Initial conditions: EL lamp 24 is completely discharged; first, fourth, and fifth switches are switched on; and second and third switches are off. Electrical energy is permitted to build up in the field of inductor 12 due to battery voltage $+V$ and the fact that the fifth switch is on (conducting).

2. Converter 27 then progressively charges EL lamp 24 at one polarity with either 8, 16 or 32 charging current pulses, depending on the characteristics of the EL lamp used, as fifth switch 23 cyclically switches off and on at a predetermined rate in order to provide for sufficient lamp brightness. The switching rate of fifth switch 23, which may be approximately 3 to 4 kHz, is predeterminedly controlled by high frequency signals provided by at least one of the different stages of the timepiece frequency divider circuit on line 54.

3. When the desired lamp voltage is reached, after the fifth switch successively switches on and off a predetermined number of times, i.e. 8, 16, or 32 times, first switch 16 and fourth switch 22 are switched off due to low frequency gating signals provided on line 50, and second switch 18 and third switch 20 are switched on due to low frequency gating signals provided on line 52 thereby permitting capacitive EL lamp 24 to discharge. The discharge of the EL lamp can occur between charging current pulses provided on line 28, due to high frequency square wave pulses on line 54, for example, that cyclically switch on and off fifth switch 23. Since the third switch is now on, the EL lamp can be recharged at opposite polarity. In other words, once the lamp has been charged at one polarity and is then discharged, the next charging current pulse on line 28 begins the charging sequence again for the EL lamp, but at opposite polarity. Obviously, to charge the EL lamp again (recharge) at a different polarity, first and fourth switches remain off, and second, third, and (initially) fifth switches remain on. As indicated above, the state of switches one, two, three, and four are controlled by low frequency gating signals provided by intermediate stages of the timepiece frequency divider circuit. The fifth switch will cyclically switch off and on in response to high frequency signals provided by an intermediate stage of the frequency divider circuit to control successive charging current pulses each produced by the converter for progressively charging capacitive EL lamp via line 28.

In drive circuit 10a of FIG. 2, which is a specific embodiment of the generic invention shown in FIG. 1, all of the switches are represented as electronic relays, i.e. a mixture of bipolar transistors and n-channel MOS transistors. Specifically the first, second, third, and fourth switches are represented as n-channel enhancement-mode (insulated gate) igfets, and the fifth switch is represented as a bipolar npn transistor. Drive circuit 10a includes inductor 12a, diodes 14a, 14b, 60 and 62, first, second, third, and fourth FETs, 16a, 18a, 20a and 22a, respectively, and npn transistor 23a. Drive circuit 10a is electrically connected to EL lamp 24a which, again, may be equivalently shown as a discrete capacitor in series with a discrete resistor as in FIG. 1.

In drive circuit 10a, inductor 12a has one terminal electrically connected to diodes 14a and 14b and to fifth switch 23a at a common point and the other terminal electrically connected to battery +V. The inductor-diodes(14a/14b)-npn transistor combination forms converter 27a, capable of stepping up battery voltage +V to between approximately 30 to 50 volts. Current pulses from inductor 12a progressively charge EL lamp 24a at each polarity, depending upon the state of switches 16a, 18a, 20a and 22a, so as to produce a peak drive voltage amplitude between approximately 60 to 100 volts peak-to-peak. The converter has low power consumption but provides a high step-up ratio.

In drive circuit 10a, inductor 12a, in line 26a, is connected to the anode of diode 14a in line 28a, to the anode of diode 14b in line 28b, and to the collector of npn transistor 23a, which is in line 30a. The emitter of npn transistor 23a is connected to ground 34a via line 40a. Converter 27a, which includes inductor 14a, diodes 14a and 14b and npn transistor 23a, is electrically connected to EL lamp 24a via lines 28a and 28b through EL lamp charging circuit (switching means) which comprises first, second, third, and fourth FETs, 16a, 18a, 20a, and 22a.

First and second FETs, 16a and 18a, in line 36a are electrically connected to line 28a, and third and fourth FETs, 20a and 22b, in line 38a are electrically connected to line 28b.

Specifically, the drain of first FET 16a, is electrically connected to the cathode of diode 14a via line 28a. The gate of first FET 16a is electrically connected to the drain of second FET 18a via line 36a. The gate of first FET 16a is also connected to line 28a through the parallel combination of resistor 70, in line 72, and capacitor 66, in line 68. As a result, first FET 16a can be a "source follower" or be non-conducting, depending upon the conducting or non-conducting state of second FET 18a as described below.

In the case when second FET 18a is non-conducting: As a current pulse from inductor 12a raises the voltage on line 28a, the voltage on line 36a also rises since second FET 18a is non-conducting. As soon as sufficient forward bias is produced between the gate and the source of first FET 16a, a current pulse is delivered to EL lamp 24a via line 61. The first FET acts as a source follower since the voltage on line 61 is less than the voltage on line 28a by the amount of the first FET "turn-on" bias. Capacitor 66 minimizes any additional voltage drop due to the total stray capacitance loading at the gate of first FET 16a.

In the case when second FET 18a is conducting: Conduction of second FET 18a causes a voltage drop across resistor 70 since line 36a is near ground potential thereby preventing first FET 16a from becoming forward biased.

Controlling the state of the first FET in this manner by directly controlling the state of the second FET eliminates the need for more complex gate drive circuitry and allows all transistors to have the same polarity, e.g. n-channel or npn. Resistor 70 and capacitor 66 can be selected so as to minimize energy loss to less than 10 percent of the energy in each current pulse provided on line 28a.

In order to control the conducting or non-conducting of first FET 16a, as described above, the source of second FET 18a is electrically connected to ground 34a via line 42a and the gate of the second FET is electrically connected to an intermediate stage of the timepiece frequency divider (not shown) via line 52a. The signals provided on line 52a may be square wave pulses.

The drain of third FET 20a is electrically connected to the cathode of diode 14b via line 28b. The gate of third FET 20a is electrically connected to the drain of fourth FET 22a via line 38a. The source of fourth FET is connected to ground 34a via line 42a and the gate of the fourth FET is electrically connected to an intermediate stage of the timepiece frequency divider (not shown) via line 50a. The signal provided on line 50a may be square wave pulses.

In the case when fourth FET 22a is non-conducting but FET 18a is conducting: a current pulse from inductor 12a raises the voltage on line 28b thereby raising the voltage on line 38a. A current pulse is then delivered to EL lamp 24a via line 63. Capacitor 74 in line 76 minimizes any additional voltage drop due to the total stray capacitance loading at the gate of the third FET 20a.

In the case when fourth FET 22a is conducting but FET 18a is non-conducting: Conduction of fourth FET 22a causes a voltage drop across resistor 78 in line 80 since line 38a is near ground potential thereby preventing third FET 20a from becoming forward biased. As before, resistor 78 and capacitor 74 can be selected so as to minimize energy loss to less than 10 percent of the energy in each current pulse provided on line 28b.

EL lamp 24a is electrically connected to line 36a between first and second FETs 16a and 18a, and to line 38a between third and fourth FETs 20a and 22a. Specifically, one end of the lamp is connected to the anode of diode 60 via line 61. The cathode of diode 60 is electrically connected to line 36a between the first and second FETs. The opposite end of the lamp is connected to the anode of diode 62 via line 63. The cathode of diode 62 is electrically connected to line 38a between the third and fourth FETs.

The source of first FET 16a is electrically connected to line 61 between lamp 24a and diode 60 and the source of third FET 20a is electrically connected to line 63 between lamp 24a and diode 62.

The npn transistor 23a is also electrically connected to an intermediate stage of the divider circuit via line 54a. In order to overcome the effect of charge stored in the npn transistor during its saturation on state, third capacitor 80 is connected in parallel with third resistor 82 which is in line 54a. When the npn transistor is on, the voltage across the third resistor is fairly high, and the third capacitor takes up considerable charge. When the npn transistor is turned off by a change of state on line 54a, the charge in the third capacitor flows into the base of the transistor and effectively cancels out the opposite charge stored there, reducing storage time. This speeds up switching times for the npn transistor.

In drive circuit 10a of FIG. 2, substantially all of the electrical energy stored in the field of inductor 12 is delivered directly to EL lamp 24a, which acts as a capacitor. The efficiency of delivering stored electrical energy directly to the EL lamp is dependent on the turn-on characteristics of the FETs. First and third FETS, 16a and 20a, are source followers effectively controlled by the state of second and fourth FETs, 18a and 22. The circuit of FIG. 2 operates in substantially the following manner:

1. At one lamp polarity: Fourth FET 22a is conducting due to a gating signal (positive voltage) on line 50a applied to its gate which controls the resistance between the FET source and drain. Since the fourth FET is conducting, one side of EL lamp 24a is effectively pulled to near ground potential, i.e. to ground 34a, via line 63 through diode 62, line 38a, fourth FET 22a and line 42a. First FET 16a now conducts current via its drain to line 61 whenever inductor 12a provides a current pulse, on line 26a and through diode 14a in line 28a, in order to charge EL lamp 24a via line 61. The charging current through diode 14a keeps first FET 16a biased in the manner described above. The number of successive charging current pulses that progressively charge the EL lamp is either 8, 16, or 32 (as controlled by npn transistor 23a) in order to provide for acceptable lamp brightness. Second FET 18a is not conducting and third FET 20a is prevented from conducting since line 38a is effectively held at ground potential, thus keeping the gate of the third FET from becoming forward biased.

2. At opposite lamp polarity: When the EL lamp is sufficiently charged, fourth FET stops conducting (turns off) due to a negative voltage along line 50a applied to its gate and second FET 18a begins conducting (turns on) due to a gating signal on line 52a applied to its gate. The EL lamp then discharges. Since the second FET is conducting, one side of EL lamp 24a is effectively pulled to (near) ground potential, i.e. to ground 34a, via line 61 through diode 60, second FET 18a and line 42a. Third FET 20a now conducts current via its drain to line 63 when inductor 12a provides the next current pulse, on line 26a and through diode 14b in line 28b, in order to charge EL lamp 24a again, but this time via line 63. The charging current through diode 14b keeps third FET 20a biased in the manner described above. First FET 16a is prevented from conducting since the EL lamp charging current through diode 60 keeps the gate of the first FET reversed biased (negative voltage) and fourth FET 22a is not conducting.

It should be clear from this discussion that the polarity of the EL lamp alternates due to the changing states of first, second, third, and fourth FETs. In fact, the polarity of the lamp changes after it is permitted to discharge, between charging current pulses, through the inductor. Discharge current from the lamp flows to the inductor through the third FET and diode 14b when diode 62 becomes reversed biased and lamp discharge current flows to the inductor through the first FET and diode 14a when diode 60 becomes reversed biased. Diode 62 becomes reversed biased when second FET is turned on and diode 60 becomes reversed biased when fourth FET is turned on. Some of the discharge current also flows through the forward biased base-collector junction of npn transistor 23a. The EL lamp is discharged between gating signals provided on line 54a, i.e. square wave pulses, used to cyclically switch on and off npn transistor 23a. The npn transistor, in a manner similar to fifth switch 23 in FIG. 1, as explained above, cyclically switches off and on at a predetermined rate to permit converter 27a to progressively charge EL lamp 24a at one polarity. The switching rate of npn transistor 23a, which may be at a high frequency of between 3 to 4 kHz, is predeterminedly controlled by high frequency signals provided by at least one of the different stages of the timepiece frequency divider circuit on line 54a. In Paragraph 2 above, the next signal (current pulse) provided by converter 27a through diode 14b, occurring after the EL lamp discharges, permits the EL lamp to begin charging again, but at another polarity. Following the events described in Paragraph 2 above, the next charging current pulse would occur after the EL lamp discharges and npn transistor 23a is off, first and fourth FETs, 16a and 22a, are conducting (turned on) and second and third FETs, 18a and 20a, are turned off.

Figure 3:
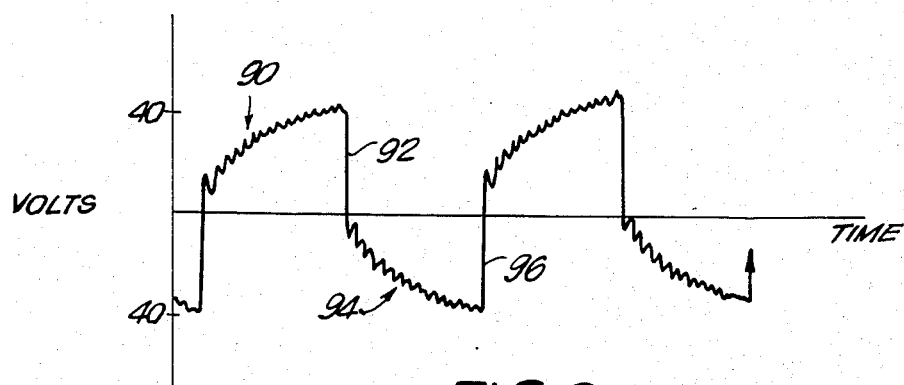
FIG. 3 is a signal diagram showing the charging signals provided by the drive circuits of FIGS. 1 and 2.

FIG. 3 shows how either circuit, described above, progressively charges an EL lamp. For positive lamp polarity, the drive circuit provides 16 successive current pulses 90 that charge the EL lamp. The EL lamp then discharges 92 when lamp polarity becomes negative and before the next current pulse is provided by the converter. While the EL lamp is at negative polarity, the converter provides 16 successive current pulses 94 that charge the EL lamp again. The lamp is then discharged 96 when lamp polarity becomes positive and before the next current pulse occurs. The EL lamp is then progressively charged again, at positive polarity, by successive current pulses produced by the converter. The lamp is continuously charged and discharged in this manner. It is clearly understood that the EL lamp provides pulsatile light output with each charging current pulse and with every lamp discharge. The number of successive current pulses required to charge the lamp may be varied due to the characteristics of the lamps used, but it is preferred that the number of successive charging pulses be either 8, 16, or 32.

The npn transistor in drive circuit 10a is implemented because collector saturation voltage is low. However, an FET device having a low gate threshold and low on-resistance can be used in place of the npn transistor. Such a device could be a Supertex, Inc. VN0107N3 device which would eliminate the base drive components and the current drain of the npn transistor. Furthermore, any good beta npn transistor could be used in place of first and third FETs, 16a and 20a. It is understood that npn transistors could also be used in place of second and fourth FETs, 18a and 22a, even though base drive components (resistors and capacitors) would be needed in the manner that resistor 82 and capacitor 80 are used with npn transistor 23a. It is understood that a number of different devices can provide for a variety of fabrication possibilities. A customized integrated circuit chip, made by a suitably high voltage process, could be used as the EL lamp drive circuit. Passive components such as resistors and capacitors could then be replaced with active components.

Inductor 12 in FIG. 1 and inductor 12a in FIG. 2 each have a diameter of approximately ⅛ inch (3.2 millimeters). It is understood that drive circuit's operation is not restricted to inductors of such size. If the inductance of either the inductor 12 or inductor 12a is 130 mH, then the switching frequency of either fifth switch 23 or npn transistor 23a should be approximately 3.0 kHz for best EL lamp charging efficiency. If the inductance of either inductor is 100 mH, then the switching frequency of either fifth switch 23 or npn transistor 23a should be approximately 4.0 kHz for best EL lamp charging efficiency, which frequency is provided by a stage of the timepiece frequency divider circuit. However, in each case, the number of successive lamp charging pulses is either 8 or 16 or 32. The duty cycle of the signal provided on either line 54 in FIG. 1 or on line 54a in FIG. 2 is approximately 75%. The 3:1 on-off ratio of the signal can be obtained from two adjacent stages of the frequency divider circuit in a manner known in the art.

The EL lamp is acceptably charged when either 8, 16, or 32 current pulses are provided by the converter, i.e. the inductor, depending upon the characteristics of the EL lamp electrically connected to the converter. Best light output efficiency is obtained with EL lamps each having a wet thickness of about 2.5 mils and a surface area of about 2 sq. cm. Each of the EL lamps also have a 25% glass grid electrode, a 100% aluminum electrode, and a capacitance of about 3400 picofarads. To reduce any effect of dielectric absorption in the binder material of the EL lamp, the binder should have high resistivity. The best light output is obtained when the converter provides sixteen successive high frequency charging current pulses to an EL lamp, having the above characteristics, at each polarity such that the EL lamp is progressively charged to between 35 to 40 volts. Other EL lamps having different dimensions, but still adaptable for use in a timepiece, may require a different number of successive charging current pulses in order to produce optimal light output. That is, other size lamps might have best efficiency for even smaller or even greater numbers of charge pulses.

In any case, the drive circuits shown in FIGS. 1 and 2 provide an efficient method for energizing EL lamps to emit high light output (up to 0.4 ft-lamberts) from a single-cell battery at low current drain. Specifically, the efficiency of the drive circuit that consumes only approximately 2 mW of power, but that drives an EL lamp that produces light with a luminance of approximately 0.4 ft-lamberts is 0.4 (ft-lamberts) (sq. cm.)/mW. The EL lamp is effectively a storage capacitor, progressively charged with successive high frequency current pulses provided by a converter. In other words, substantially all of the energy in the converter is delivered directly to the EL lamp. Any energy interchange occurs between the lamp and the inductor in the converter. The effects of dc voltage and imposed ac voltage combine to enhance the EL lamp light output. The EL lamp is used in timepieces which already include the single-cell battery and the frequency divider circuit that provides low frequency gating signals for controlling the polarity of the lamp and high frequency signals for controlling the charging of the EL lamp. It is understood, though, that the circuits discussed herein can be implemented in calculators and substantially any other device having a display that is backlighted by a capacitive EL lamp.

The drive circuits disclosed herein can provide power conversion efficiency for a variety of EL lamp characteristics. As a result, drive circuit fabrication is substantially independent of EL lamp fabrication. The only major drive circuit constraints are that a battery (1.5 volts) be used to provide current to a single inductor. The ferrite volume in the inductor core may be adjusted (decreased) to achieve the results herein described. The major constraints imply restrictions on power consumption (low), component size (reduced), and cost (low). The major assumption is that a binary frequency divider circuit is available to provide timing waveforms and gating signals in order to turn on and off components of the converter and the EL lamp charging circuits (switching means) discussed above.

It is understood that, depending upon the choice of circuit fabrication by one skilled in the art, the entire drive circuit could be built with either NMOS or bipolar devices alone thereby requiring only a slight change in parts count, component values, and operating efficiency. The desired brightness and EL lamp area will determine whether average battery current should be less or more than 1 mA. It may be possible to energize EL lamps with batteries having high internal resistance that provide maximum load currents of less than 1 mA. A bypass capacitor may be required in this case in order to smooth the current pulses which generally have a peak-to-average ratio of about 3.

What is claimed is:

1. In a device having a capacitive electroluminescent lamp, a battery and signal generating means for providing first signals and second signals, the improvement comprising:
    a converter electrically connected to said battery, to said signal generating means, and to said capacitive electroluminescent lamp for producing current pulses, and
    switching means electrically connected to said signal generating means, to said capacitive electroluminescent lamp, and to said converter and responsive to said second signals for switching a predetermined number of said current pulses to said capacitive electroluminescent lamp to produce light, and responsive to said first signals for reversing the polarity of said capacitive electroluminescent at the end of said predetermined number of current pulses whereby the combined effects of dc battery voltage and said current pulses which pulse charge the capacitance of said electroluminescent lamp combine to enhance the light output from said capacitive electroluminescent lamp.

2. The device of claim 1, in which said device is a timepiece backlighted by said capacitive electroluminescent lamp.

3. The device of claim 1, in which said first signals are low frequency signals.

4. The device of claim 1, in which said second signals are high frequency signals.

5. The device of claim 1, in which said current pulses are successive current pulses.

6. The device of claim 5, in which said successive current pulses progressively charge said capacitive electroluminescent lamp.

7. The device of claim 1, in which said converter includes one inductor for producing said current pulses.

8. The device of claim 1, in which said battery has a voltage of approximately 1.5 volts.

9. The device of claim 8, in which said battery voltage is stepped up by said converter to between 30 to 50 volts for producing said current pulses.

10. The device of claim 7, in which said inductor is electrically connected between said battery and said capacitive electroluminescent lamp.

11. The device of claim 1, in which said switching means includes five switches wherein four switches are responsive to said first signals for reversing the polarity of said capacitive electroluminescent lamp and one switch is responsive to said second signals for switching a predetermined number of successive current pulses to said capacitive electroluminescent lamp.

12. The device of claim 11, in which said one switch switches on and off at a rate of approximately 3 to 4 kHz to provide for successive current pulses produced by said converter.

13. The device of claim 12, in which said one switch provides for 16 successive current pulses for progressively charging said capacitive electroluminescent lamp.

14. The device of claim 1, in which said first and second signals are square wave pulses.

15. The device of claim 14, in which said second signal has a duty cycle of 75 percent.

16. The device of claim 10, in which said inductor is ⅛ inch in diameter.

17. The device of claim 1, in which the capacitive electroluminescent lamp has a wet thickness of about 2.5 mils, a surface area of about 2 square centimeters, and a capacitance of approximately 3400 picofarads.

18. The drive circuit of claim 1, in which said capacitive electroluminescent discharges at the end of said predetermined number of current pulses.

19. An efficient drive circuit electrically connected to a capacitive electroluminescent lamp that provides backlighting for a timepiece in which the timepiece includes a battery and a frequency divider circuit, comprising:

a converter electrically connected to said battery, to said frequency divider circuit, and to said capacitive electroluminescent lamp for stepping up the battery voltage to provide current pulses that charge said capacitive electroluminescent lamp to produce light, and switching means electrically connected to said frequency divider circuit, to said capacitive electroluminescent lamp, and to said converter and responsive to intermediate frequency signals provided by said frequency divider circuit for switching a predetermined number of successive current pulses at high frequency that progressively charge said capacitive electroluminescent lamp and for reversing the polarity of said capacitive electroluminescent lamp at low frequency when said capacitive electroluminescent lamp discharges at the end of a predetermined number of successive current pulses whereby the combined effects of dc battery voltage and said current pulses which pulse charge the capacitance of said electroluminescent lamp combine to enhance the light output from said capacitive electroluminescent lamp.

* * * * *